US012803380B2

(12) United States Patent
Francis et al.

(10) Patent No.: US 12,803,380 B2
(45) Date of Patent: Nov. 17, 2026

(54) ROTATING MACHINE AND DRIVE MODULE ASSEMBLY INCLUDING THE SAME

(71) Applicant: BorgWarner Inc., Auburn Hills, MI (US)

(72) Inventors: Philip J. Francis, Lapeer, MI (US); Kevin Beutler, Columbiaville, MI (US); Gregory L. Beyerlein, Clarkston, MI (US); Logan Krupp, Rochester, MI (US)

(73) Assignee: BORGWARNER INC., Auburn Hills, MI (US)

( * ) Notice: Subject to any disclaimer, the term of this patent is extended or adjusted under 35 U.S.C. 154(b) by 750 days.

(21) Appl. No.: 18/209,679

(22) Filed: Jun. 14, 2023

(65) Prior Publication Data

US 2024/0421659 A1 Dec. 19, 2024

(51) Int. Cl.

| | |
|---|---|
| ***H02K 5/10*** | (2006.01) |
| ***F16J 15/32*** | (2016.01) |
| ***F16J 15/3204*** | (2016.01) |
| ***F16J 15/3232*** | (2016.01) |
| ***H02K 5/124*** | (2006.01) |
| ***H02K 5/16*** | (2006.01) |
| ***H02K 7/14*** | (2006.01) |

(52) U.S. Cl.

CPC ................. *H02K 7/14* (2013.01); *H02K 5/10* (2013.01); *H02K 5/16* (2013.01)

(58) Field of Classification Search

CPC ............ H02K 5/10; H02K 5/16; H02K 5/124; H02K 5/128; H02K 7/14; F16J 15/3204; F16J 15/3216; F16J 15/322; F16J 15/3228; F16J 15/3236; F16J 15/16

See application file for complete search history.

(56) References Cited

U.S. PATENT DOCUMENTS

| | | | | |
|---|---|---|---|---|
| 5,292,199 A * | 3/1994 | Hosbach | F16C 33/7813 | 277/423 |
| 5,687,973 A * | 11/1997 | Ruppert, Jr. | F16J 15/3252 | 277/423 |
| 5,979,903 A * | 11/1999 | Kwasniewski | F16J 15/164 | 277/423 |
| 7,156,400 B2 * | 1/2007 | Oates | F16J 15/3264 | 277/572 |
| 7,174,978 B2 * | 2/2007 | Taniguchi | B60K 6/26 | 903/905 |

(Continued)

FOREIGN PATENT DOCUMENTS

| | | | |
|---|---|---|---|
| DE | 102017100097 A1 * | 8/2017 | F16H 48/36 |
| DE | 202019102992 U1 * | 9/2019 | F16C 33/7886 |

(Continued)

*Primary Examiner* — Edgardo San Martin

(74) *Attorney, Agent, or Firm* — Howard & Howard Attorneys PLLC

(57) ABSTRACT

A rotating machine includes a housing defining a housing interior, an output shaft disposed in the housing interior, extending along an output axis, and configured to be rotatably coupled to an external shaft, a first seal engaged with the output shaft and the housing for preventing ingress of debris into the housing interior; and a slinger seal engaged with both of the output shaft and the first seal for further preventing ingress of debris into the housing interior by preventing ingress of debris toward the first seal.

20 Claims, 5 Drawing Sheets

(56) References Cited

U.S. PATENT DOCUMENTS

| | | | | |
|---|---|---|---|---|
| 8,102,087 | B2 * | 1/2012 | Yamamoto | H02K 7/116 310/83 |
| 8,573,601 | B2 * | 11/2013 | Nakagawa | F16J 15/3264 277/572 |
| 8,784,254 | B2 * | 7/2014 | Zink | F16H 57/037 464/7 |
| 9,982,713 | B2 * | 5/2018 | Seo | F16C 33/80 |
| 10,208,861 | B2 * | 2/2019 | Hamamoto | F16J 15/3232 |
| 10,240,674 | B2 * | 3/2019 | Sakai | F16J 15/3264 |
| 10,622,864 | B2 * | 4/2020 | Hiramitsu | H02K 5/225 |
| 12,485,741 | B2 * | 12/2025 | Lim | F16J 15/3232 |
| 12,535,139 | B2 * | 1/2026 | Wylie | F16J 15/3232 |
| 2011/0006485 | A1 * | 1/2011 | Nakagawa | F16J 15/32 277/549 |
| 2019/0226584 | A1 * | 7/2019 | Cabaj | F16J 15/3232 |
| 2020/0191195 | A1 * | 6/2020 | Honda | F16J 15/3404 |

FOREIGN PATENT DOCUMENTS

| | | | | | |
|---|---|---|---|---|---|
| DE | 102021207055 | A1 | * | 1/2023 | F16C 33/76 |
| DE | 102022201483 | A1 | * | 8/2023 | F16C 33/7883 |
| JP | H07174147 | A | * | 7/1995 | F16C 33/805 |
| JP | H10110695 | A | * | 4/1998 | |
| JP | 2804517 | B2 | * | 9/1998 | |
| JP | 2592825 | Y2 | * | 3/1999 | |
| JP | 4471079 | B2 | * | 6/2010 | |
| JP | 4822537 | B2 | * | 11/2011 | F16C 33/7876 |
| JP | 6569275 | B2 | * | 9/2019 | F16C 33/7876 |
| JP | 7263855 | B2 | * | 4/2023 | F16C 19/181 |

* cited by examiner

ROTATING MACHINE AND DRIVE MODULE ASSEMBLY INCLUDING THE SAME

BACKGROUND OF THE DISCLOSURE

1. Field of the Disclosure

This invention relates generally to rotating machine, and in particular to a rotating machine for use in a drive module assembly.

2. Description of the Related Art

Typical rotating machines include a housing defining a housing interior, an output shaft disposed in the housing interior, extending along an output axis, and configured to be rotatably coupled to an external shaft, and a seal engaged with the output shaft and the housing for preventing ingress of debris into the housing interior and for preventing expulsion of lubricant outward from the housing interior.

A typical drive module assembly may include such a typical rotating machine, with the drive module assembly also including an input shaft extending coupled to the housing and configured to receive rotational torque from a power source, and a gear train disposed in the housing interior and rotatably coupled to the input shaft, with the output shaft being rotatably coupled to the gear train and configured to provide rotational torque to wheels of a vehicle.

It is important to protect various components of the rotating machines and drive module assemblies by preventing debris and contaminants from entering the housing interior. Keeping debris outside of the housing interior lengthens corrosion protection, general lifespan, etc. of various components of the drive module assembly. Various seals are used to prevent debris and contaminants from entering the housing interior. However, balancing performance of various seals versus the cost of the various seals often leads to sacrificing either performance or cost of the rotating machine.

To this end, there remains a need for an improved rotating machine.

SUMMARY OF THE INVENTION

A rotating machine includes a housing defining a housing interior, an output shaft disposed in the housing interior, extending along an output axis, and configured to be rotatably coupled to an external shaft, a first seal engaged with the output shaft and the housing for preventing ingress of debris into the housing interior; and a slinger seal engaged with both of the output shaft and the first seal for further preventing ingress of debris into the housing interior by preventing ingress of debris toward the first seal.

BRIEF DESCRIPTION OF THE DRAWINGS

Other advantages of the present disclosure will be readily appreciated, as the same becomes better understood by reference to the following detailed description when considered in connection with the accompanying drawings.

DETAILED DESCRIPTION OF THE INVENTION

Figure 1:
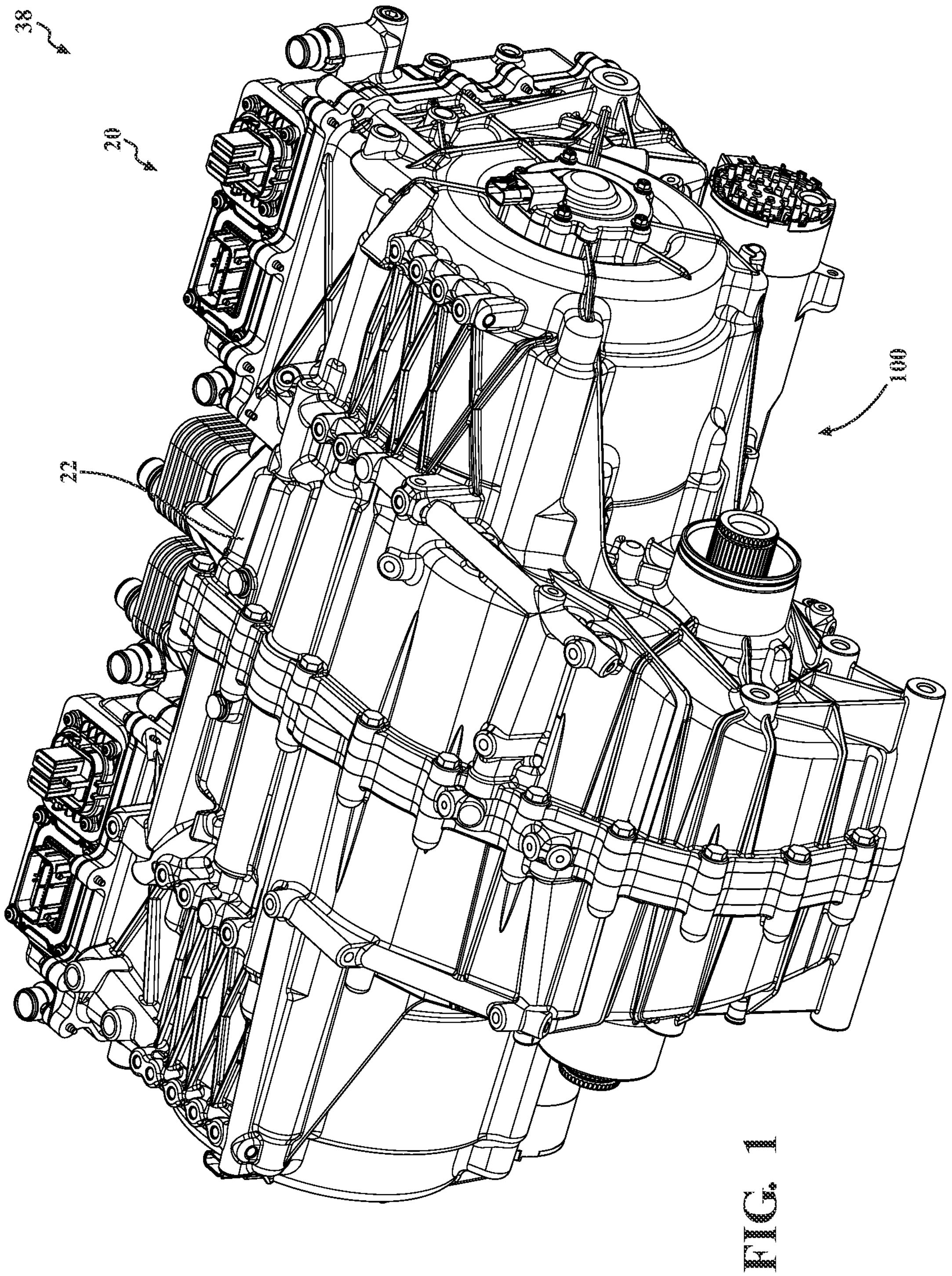
FIG. 1 is a perspective view of a drive module assembly including a rotating machine having a housing.
Figure 2:
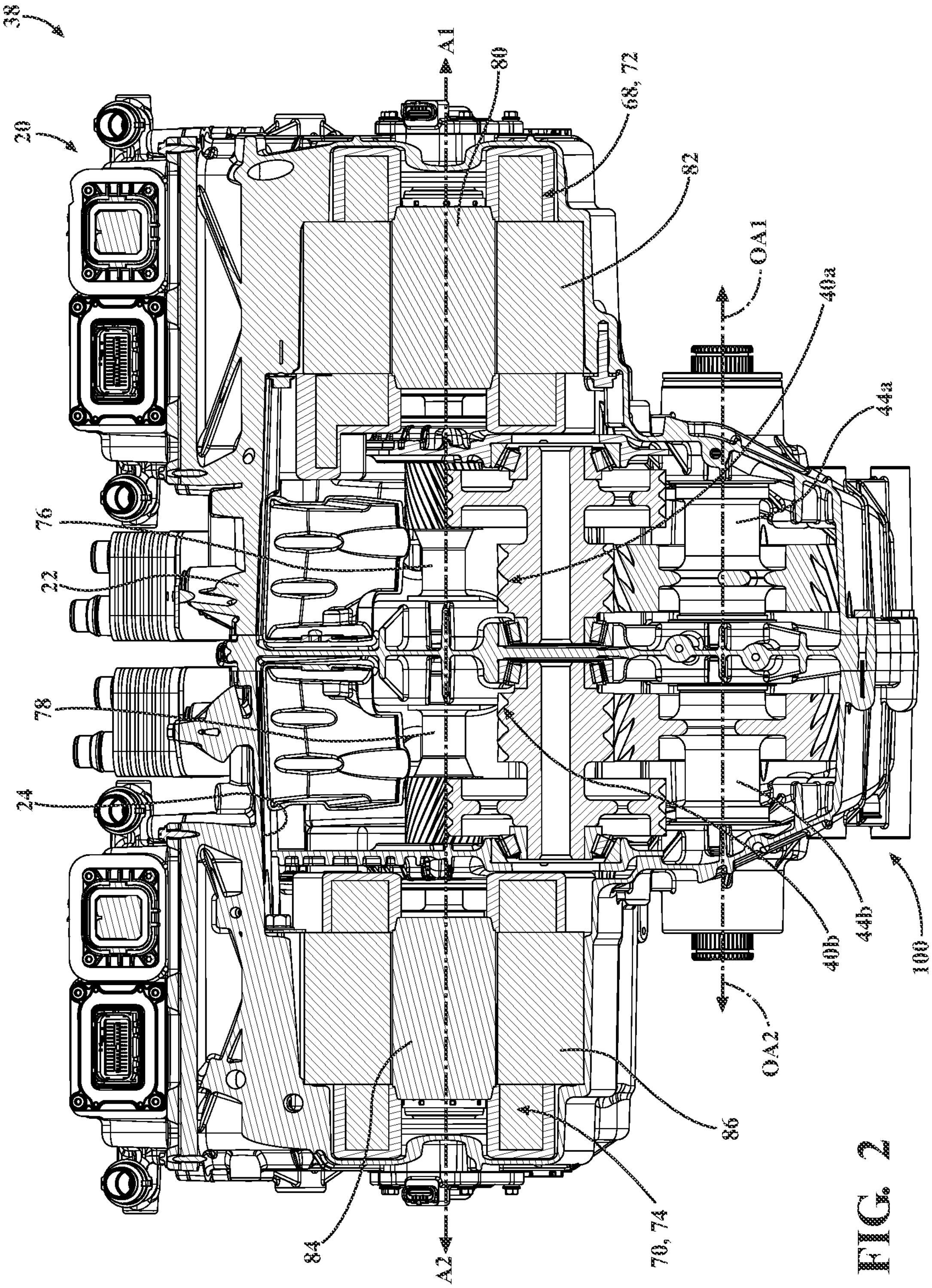
FIG. 2 is a cross-sectional view of the drive module assembly, with the drive module assembly including an input shaft, a gear train, an output shaft, a second input shaft, a second gear train, and a second output shaft.
Figure 3:
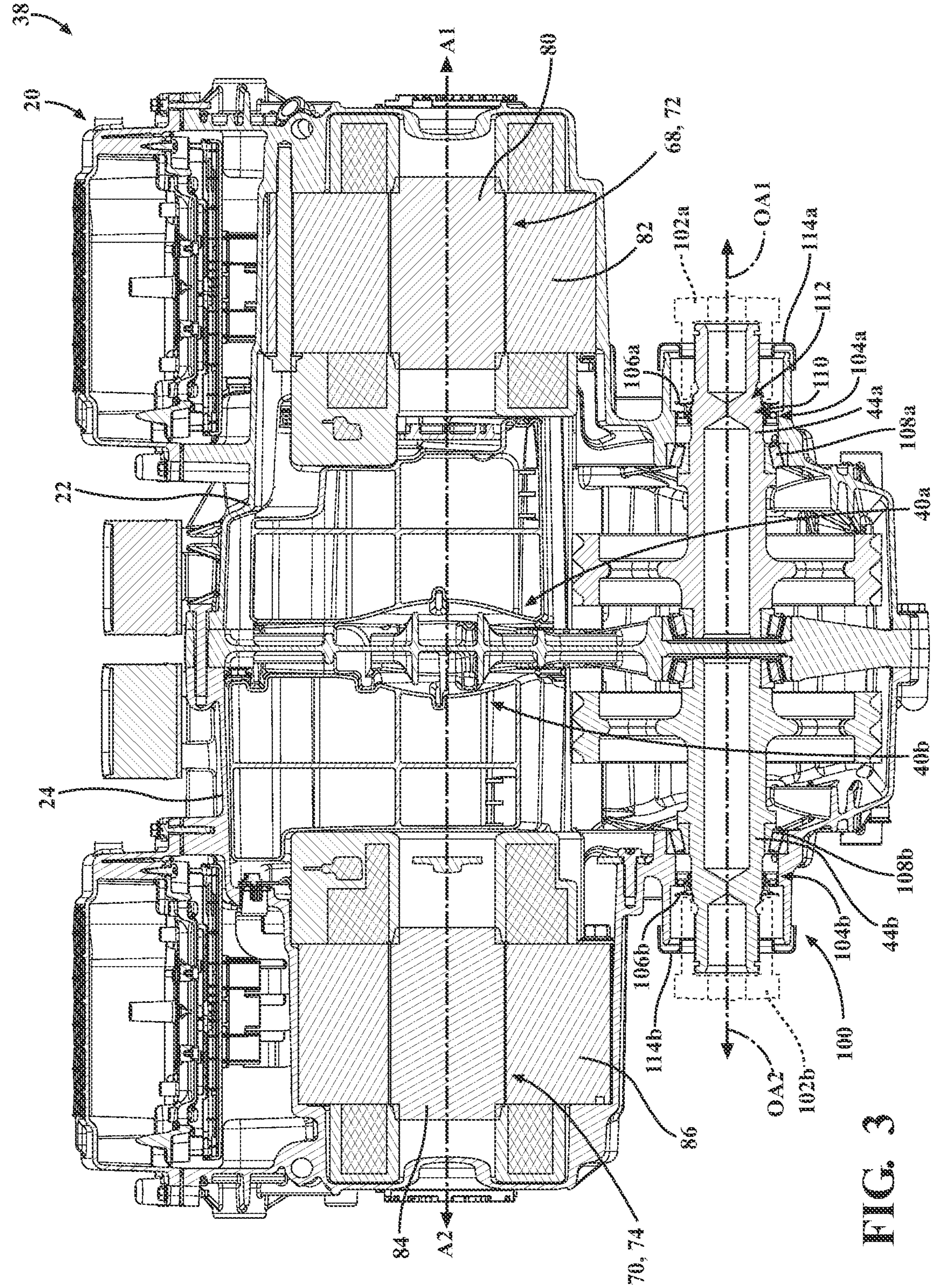
FIG. 3 is another cross-sectional view of the rotating machine and the drive module assembly, with the rotating machine including a first seal engaged with the output shaft and the housing for preventing ingress of debris into the housing interior, and a slinger seal engaged with both of the output shaft and the first seal for further preventing ingress of debris into the housing interior by preventing ingress of debris toward the first seal.
Figure 4:
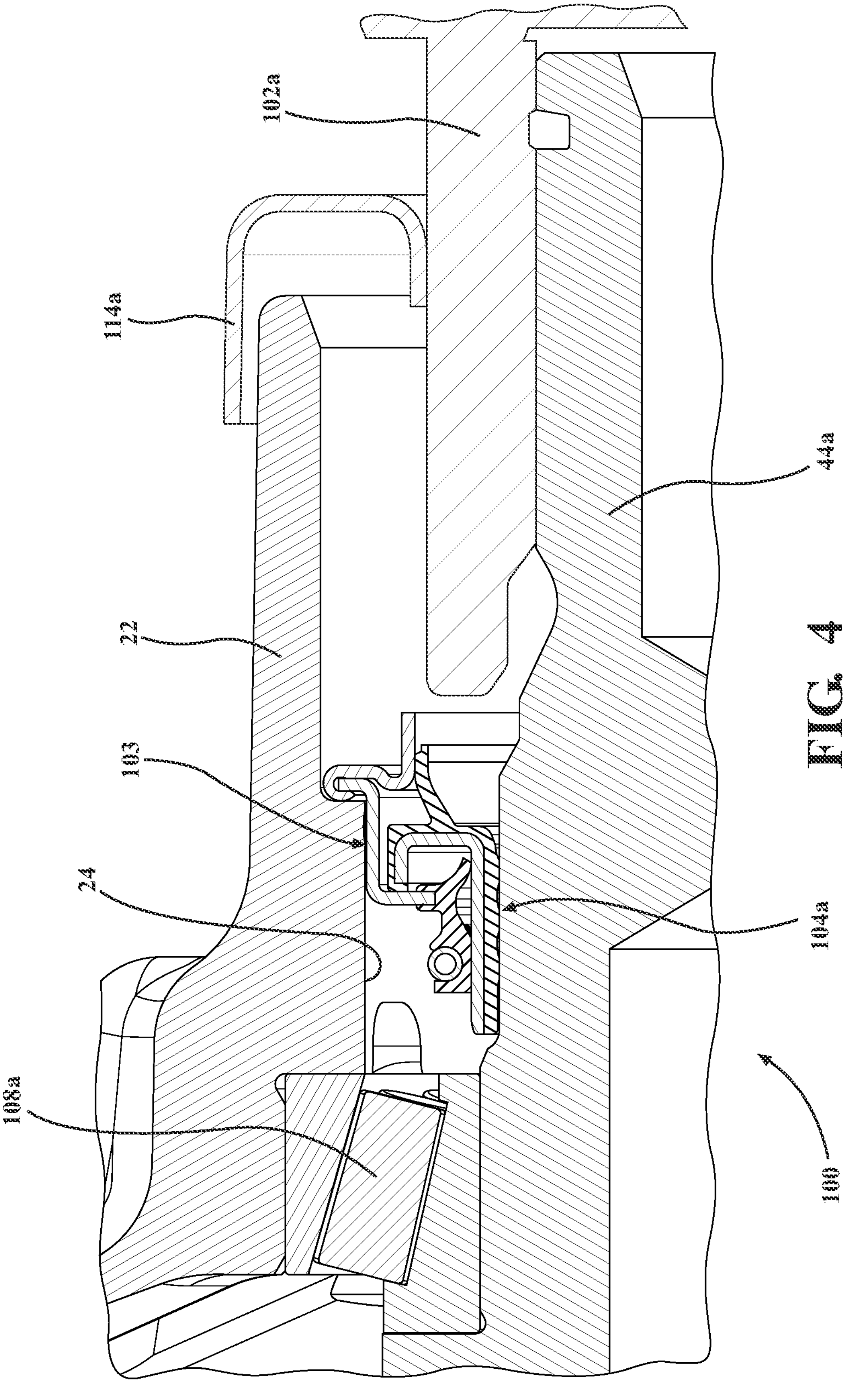
FIG. 4 is another cross-sectional view of a prior art rotating machine.
Figure 5:
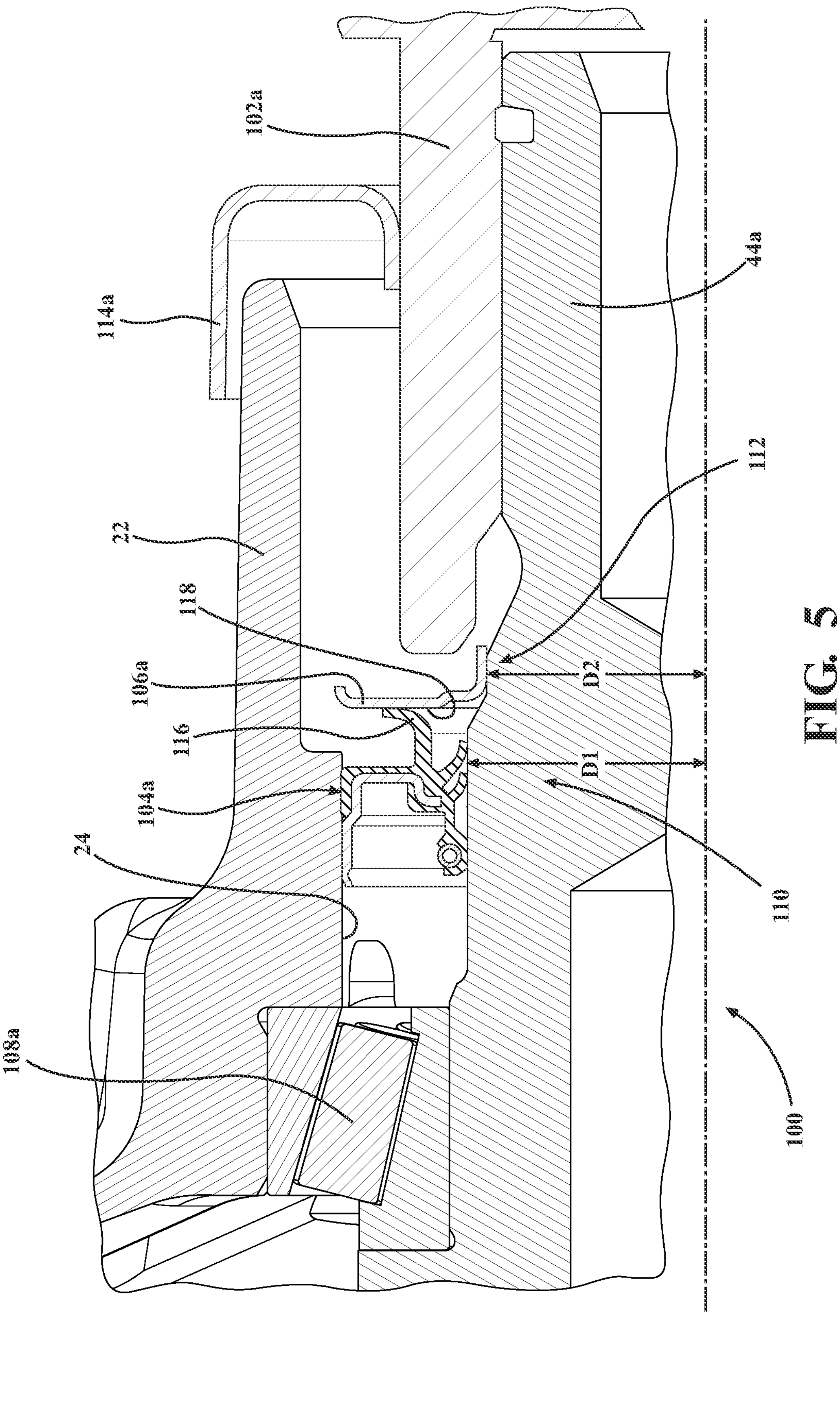
FIG. 5 is a cross-sectional view of the rotating machine including the output shaft, the first seal, the slinger seal, and a bearing, with the output shaft being rotatably coupled to an external shaft and with a secondary slinger engaged with the external shaft and the housing.

With reference to the Figures, wherein like numerals indicate like parts throughout the several views, a rotating machine 100 is generally shown in FIGS. 1-5. Examples of the rotating machine 100 include a drive module assembly (as described below), transfer cases, internal combustion engines, transmissions, electric machines and propulsion systems, and the like. The rotating machine 100 includes a housing 22 defining a housing interior 24. With reference to FIG. 3, the rotating machine 100 includes an output shaft **44*a* disposed in the housing interior 24. The output shaft 44*a* extends along an output axis OA1 and is configured to be rotatably coupled to an external shaft 102*a*, as shown in FIG. 5. The output shaft 44*a* is configured to provide rotational torque to the external shaft 102*a*, which may provide rotational torque to, for example, wheels of a vehicle. The external shaft 102*a* may be further defined as a half shaft. The rotating machine 100 further includes a first seal 104 engaged with the output shaft 44*a* and the housing 22 for preventing ingress of debris into the housing interior 24. The first seal 104 also prevents expulsion of lubricant from the housing interior 24. The rotating machine 100 additionally includes a slinger seal 106*a* engaged with both of the output shaft 44*a* and the first seal 104 for further preventing ingress of debris into the housing interior 24 by preventing ingress of debris toward the first seal 104*a*. The slinger seal 106*a* also prevents expulsion of lubricant from the housing interior 24. The slinger seal 106*a* may be comprised of steel, such as stainless steel, and the slinger seal 106*a* may be a plated and/or coated steel, such as zinc plated or coated. The slinger seal 106*a* being comprised of stainless steel or plated/coated steel helps reduce corrosion of the slinger seal 106*a*. The slinger seal 106*a* is typically configured to direct debris away from the housing interior 24 with respect to the output axis OA1. The slinger seal 106*a* may have a generally U-shaped configuration facing away from the housing interior 24 with respect to the output axis OA1**.

Having the rotating machine 100 additionally includes a slinger seal **106*a* engaged with both of the output shaft 44*a* and the first seal 104*a* for further preventing ingress of debris into the housing interior 24 by preventing ingress of debris toward the first seal 104*a* offers several advantages. First, the slinger seal 106*a* prevents ingress of debris toward the first seal 104, which provides additional protection for the housing interior 24 and the first seal 104. Second, using the slinger seal 106*a* in addition to the first seal 104*a* allows the rotating machine 100** to utilize a less complex first seal

104 due to the additional protection afforded by the slinger seal 106*a*. Specifically, as shown in FIG. 4, the seal in FIG. 4 is a unitized seal 103, which offers exceptional sealing characteristics. However, such unitized seals 103 are expensive when compared to other seals. To this end, using the seal 104*a* shown in FIG. 5 in combination with the slinger seal 106*a*, the combination of which is less complex than the unitized seal 103 of FIG. 4, offers comparable performance all while significantly reducing the cost of the rotating machine 100.

In one embodiment, the slinger seal 106*a* and the seal 104*a* are directly engaged with one another (i.e., touching one another). In such embodiments, the seal 104*a* may have a seal projection 116 extending toward and touching a back slinger surface 118 of the slinger seal 106*a*. Typically, the back slinger surface 118 faces the housing interior 24. The slinger seal 106*a* is configured to direct debris along the output axis OA1 and away from the housing interior 24 (i.e., opposite from the back slinger surface 118).

With continued reference to FIG. 5, the rotating machine 100 may include a bearing 108*a* coupled to the output shaft 44*a* for supporting rotation of the output shaft 44*a*. The first seal 104*a* is disposed between the bearing 108*a* and the slinger seal 106*a* with respect to the output axis OA1. In one embodiment, the bearing 108*a* is further defined as a tapered bearing. When the bearing 108*a* is a tapered bearing, the output shaft 44*a* and the first seal 104*a* are axially fixed with respect to the output axis OA1. Having the output shaft 44*a* and the first seal 104*a* axially fixed to one another improves the interaction between the output shaft 44*a*, the first seal 104*a*, and the slinger seal 106*a*, which even further improves performance of the rotating machine. Additionally, having the first seal 104*a* and the slinger seal 106*a* fixed on the output shaft 44*a*, any movement between the output shaft 44*a* and the external shaft 102*a* is minimized. Alternatively, the bearing 108*a* may be any other suitable bearing, such as a ball bearing.

The output shaft 44*a* may have a first output portion 110 having a first shaft diameter D1, and a second output portion 112 having a second shaft diameter D2. In one embodiment, the first shaft diameter D1 is greater than the second shaft diameter D2. In such embodiments, the first seal 104*a* may be engaged with the first output portion 110 and the slinger seal 106*a* is engaged with the second output portion 112.

A drive module assembly 20, as generally shown in FIGS. 1-5, may include the rotating machine 100. The drive module assembly 20 may be used with an internal combustion engine, electric propulsion system, or any other system requiring lubrication and lubrication control. With reference to FIG. 2, the drive module assembly 20 includes an input shaft 76 extending along an input axis A1 and coupled to the housing 22. The input shaft 76 is configured to receive rotational torque from a power source 68, such as an internal combustion engine, an electric machine, and the like. It is to be appreciated that the external shaft 102*a* and the drive module assembly 20 collectively form a drive module system 38. It is also to be appreciated that the power source 68, the external shaft 102*a*, and the drive module assembly 20 collectively form the drive module system 38. The power source 68 of the drive module system 38 may be any suitable power source for providing rotational torque to the input shaft 76. For example, the power source 68 may be further defined as internal combustion engine. In another embodiment, as shown in FIG. 2, the power source 68 may be further defined as an electric machine 72.

The drive module system 38 may include a secondary slinger seal 114*a* (e.g., an external slinger seal) engaged with the external shaft 102*a* and the housing 22 for preventing ingress of debris into the housing interior 24. When the secondary slinger seal 114*a* is present, the slinger seal 106*a* is disposed between the first seal 104*a* and the secondary slinger seal 114*a*. The secondary slinger seal 114*a* may have a U-shape configuration that overlaps the housing 22 toward the slinger seal 106*a* with respect to the output axis OA1. Having the secondary slinger seal 114*a* in addition to the slinger seal 106*a* provides a further line of defense to prevent debris from entering the housing interior 24. Using the seal 104*a* shown in FIG. 5 in combination with the slinger seal 104*a* and the secondary slinger seal 114*a* offers comparable if not improved performance all while significantly reducing the cost of the rotating machine 100 as compared to using the unitized seal 103 shown in FIG. 4.

With reference to FIGS. 2 and 3, the drive module assembly 20 further includes a gear train 40*a* disposed in the housing interior 24. The gear train 40*a* is rotatably coupled to the input shaft 76. The gear train 40*a* may be any suitable gear train for transmitting rotational torque from the input shaft 76. The gear train 40*a* may include any number of gears 42, such as two gears, three gears, four gears, or five or more gears, to transmit torque. The gear train 40*a* may include any number of shafts and layshafts, and the gear train 40*a* may also be an epicyclic gear train (planetary gearset).

The drive module assembly 20 further may include a second input shaft 78 disposed in the housing interior 24, extending along a second input axis A2, and coupled to the housing 22. The second input shaft 78 is configured to receive rotational torque from a second power source 70, such as an internal combustion engine, and electric machine, and the like. It is to be appreciated that the first power source 68, the second power source 70, and the drive module assembly 20 collectively form the drive module system 38.

In one embodiment, the first power source 68 is further defined as the electric machine 72 and the second power source 70 is further defined as a second electric machine 74. The first power source 68 is configured to provide rotational torque to the first input shaft 76, and the second power source 70 is configured to provide rotational torque to the second input shaft 78. The first electric machine 72 typically has a first rotor 80 coupled to the first input shaft 76 and a first stator 82 disposed about the first rotor 80. Similarly, the second electric machine 74 typically has a second rotor 84 coupled to the second input shaft 78 and a second stator 86 disposed about the second rotor 84. Both the first and second electric machines 72, 74 may be configured as an electric motor and/or as a generator.

The drive module assembly 20 may additionally include a second gear train 40*b* disposed in the housing interior 24 and rotatably coupled to the second input shaft 78. The second gear train 40*b* may be any suitable gear train for transmitting rotational torque from the second input shaft 78. The second gear train 40*b* may include any number of gears 42, such as two gears, three gears, four gears, or five or more gears, to transmit torque. The second gear train 40*b* may include any number of shafts and layshafts, and the second gear train 40*b* may also be an epicyclic gear train (planetary gearset). The drive module assembly 20 may include a second output shaft 44*b* disposed in the housing interior 24, extending along a second output axis OA2, and configured to be rotatably coupled to a second external shaft 102*b*. The second output shaft 44*b* is also rotatably coupled to the second gear train 40*b*. The second output shaft 44*b* is configured to provide rotational torque to the second external shaft 102*b*, which may, for example, provide rotational torque to wheels of a vehicle.

The drive module assembly 20 may include a second seal 104*b* engaged with the second output shaft 44*b* and the housing 22 for preventing ingress of debris into the housing interior 24, and a second slinger seal 106*b* engaged with the second output shaft 44*b* and the second seal 104*b*. It is to be appreciated that the description set forth above and below with respect to the first seal 104*a* and the slinger seal 106*a* equally applies to the second seal 104*b* and the second slinger seal 106*b*, respectively.

The drive module assembly 20 may include a second bearing 108*b* coupled to the second output shaft 44*b* for supporting rotation of the second output shaft 44*b*, with the second seal 104*b* being disposed between the second bearing 108*b* and the second slinger seal 106*b* with respect to the second output axis OA2. Similar to the bearing 108*a*, the second bearing 108*b* may be further defined as a second tapered bearing such that the second output shaft 44*b* and the second seal 104*b* are axially fixed with respect to the second output axis OA2. It is to be appreciated that the description set forth above with respect to the first bearing 108*a* equally applies to the second bearing 108*b*.

The drive module system 38 may include a second secondary slinger seal 114*b* engaged with the second external shaft 102*b* and the housing 22 for preventing ingress of debris into the housing interior 24, with the second slinger seal 114*b* being disposed between the second seal 104*b* and the second secondary slinger seal with respect to said second output axis. It is to be appreciated that the description with respect to the secondary slinger seal 114*a* set forth above equally applies to the second secondary slinger seal 114*b*.

What is claimed is:

1. A rotating machine comprising:

a housing defining a housing interior;

an output shaft disposed in said housing interior, extending along an output axis, and configured to be rotatably coupled to an external shaft;

a first seal engaged with said output shaft and said housing for preventing ingress of debris into said housing interior; and a slinger seal engaged with both of said output shaft and said first seal for further preventing ingress of debris into said housing interior by preventing ingress of debris toward said first seal;

wherein slinger seal comprises a slinger body portion transversely oriented with respect to said output axis, wherein said slinger body portion has a back slinger surface facing said first seal, and wherein said first seal engages said back slinger surface; and wherein said slinger seal further comprises a slinger arm extending from said slinger body portion and away from said first seal and said back slinger surface such that said slinger seal is configured to direct debris along said output axis and away from said housing interior.

2. The rotating machine as set forth in claim 1 further comprising a bearing coupled to said output shaft for supporting rotation of said output shaft, wherein said first seal is disposed between said bearing and said slinger seal with respect to said output axis.

3. The rotating machine as set forth in claim 2, wherein said bearing is further defined as a tapered bearing such that said output shaft and said first seal are axially fixed with respect to said output axis.

4. The rotating machine as set forth in claim 1, wherein said output shaft has a first output portion having a first shaft diameter, and a second output portion having a second shaft diameter, wherein said first shaft diameter is greater than said second shaft diameter, and wherein said first seal is engaged with said first output portion and said slinger seal is engaged with said second output portion.

5. A drive module assembly comprising said rotating machine as set forth in claim 1, said drive module assembly further comprising:

an input shaft disposed in said housing interior, extending along an input axis, coupled to said housing, and configured to receive rotational torque from a power source; and a gear train disposed in said housing interior and rotatably coupled to said input shaft and said output shaft.

6. The drive module assembly as set forth in claim 5 comprising said power source, wherein said power source is further defined as an electric machine.

7. The drive module assembly as set forth in claim 5, wherein said output shaft has a first output portion having a first shaft diameter, and a second output portion having a second shaft diameter, wherein said first shaft diameter is greater than said second shaft diameter, and wherein said first seal is engaged with said first output portion and said slinger seal is engaged with said second output portion.

8. A drive module system comprising said drive module assembly as set forth in claim 5, wherein said drive module system comprises said external shaft.

9. The drive module system as set forth in claim 8, further comprising a secondary slinger seal engaged with said external shaft and said housing for preventing ingress of debris into said housing interior, wherein said slinger seal is disposed between said first seal and said secondary slinger seal with respect to said output axis.

10. The drive module system as set forth in claim 9, wherein said secondary slinger seal has a U-shape configuration that overlaps said housing toward said slinger seal with respect to said output axis.

11. The drive module assembly as set forth in claim 5 further comprising, a second output shaft disposed in said housing interior, extending along a second output axis, and configured to be rotatably coupled to a second external shaft, a second seal engaged with said second output shaft and said housing for preventing ingress of debris into said housing interior, a second slinger seal engaged with said second output shaft and said second seal, a second input shaft disposed in said housing interior, extending along a second input axis, coupled to said housing, and configured to receive rotational torque from a second power source, and a second gear train disposed in said housing interior and rotatably coupled to said second input shaft and said second output shaft.

12. The drive module assembly as set forth in claim 11 further comprising a bearing coupled to said output shaft for supporting rotation of said output shaft, and a second bearing coupled to said second output shaft for supporting rotation of said second output shaft, wherein said first seal is disposed between said bearing and said slinger seal with respect to said output axis, and wherein said second seal is disposed between said second bearing and said second slinger seal with respect to said second output axis.

13. The drive module assembly as set forth in claim 11, comprising said power source and said second power source, wherein said power source is further defined as an electric machine and said second power source is further defined as a second electric machine.

14. A drive module system comprising said drive module assembly as set forth in claim 11, wherein said drive module system comprises said external shaft and said second external shaft.

15. The drive module system as set forth in claim 14 further comprising a secondary slinger seal engaged with said external shaft and said housing for preventing ingress of debris into said housing interior, and a second secondary slinger seal engaged with said second external shaft and said housing for preventing ingress of debris into said housing interior, wherein said slinger seal is disposed between said first seal and said secondary slinger seal with respect to said output axis, and wherein said second slinger seal is disposed between said second seal and said second secondary slinger seal with respect to said second output axis.

16. The drive module system as set forth in claim 14, wherein said drive module assembly comprises said power source and said second power source, wherein said power source is further defined as an electric machine and said second power source is further defined as a second electric machine.

17. The rotating machine as set forth in claim 1, wherein said slinger seal further comprises a second slinger arm spaced radially from said slinger arm with respect to said output axis, and wherein said second slinger arm extends from said slinger body portion and away from said first seal and said back slinger surface such that slinger seal is configured to direct debris along said output axis and away from said housing interior.

18. The rotating machine as set forth in claim 17, wherein said slinger arm is engaged with said output shaft.

19. The rotating machine as set forth in claim 18, wherein said slinger arm has a first length, wherein said second slinger arm has a second length, and wherein said second length is less than said first length.

20. The rotating machine as set forth in claim 1, the first seal comprises a seal projection extending toward and engaging the back slinger surface.

* * * * *